April 26, 1938.  B. W. JONES  2,115,582
TIME DELAY UNDERVOLTAGE PROTECTIVE SYSTEM
Filed March 19, 1936
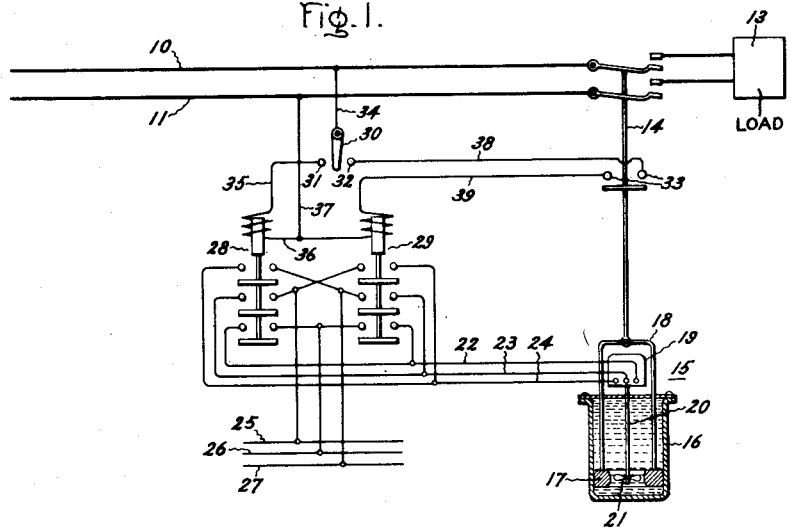
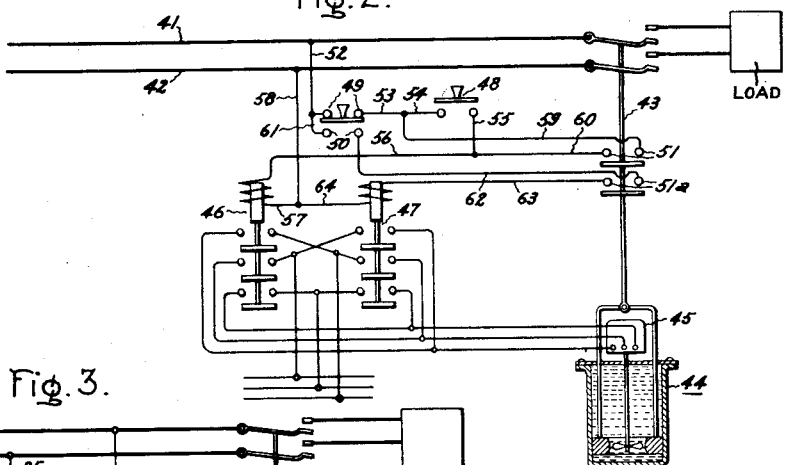
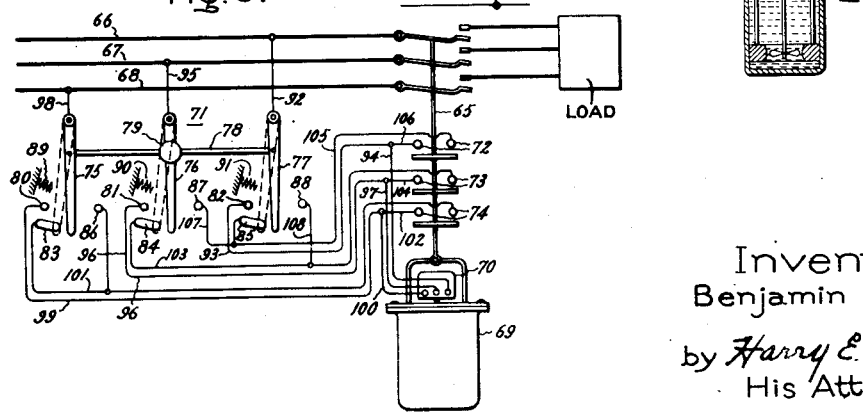
Inventor:
Benjamin W. Jones,
by Harry E. Dunham
His Attorney.

Patented Apr. 26, 1938

2,115,582

UNITED STATES PATENT OFFICE 2,115,582

TIME DELAY UNDERVOLTAGE PROTECTIVE SYSTEM

Benjamin W. Jones, Schenectady, N. Y., assignor to General Electric Company, a corporation of New York Application March 19, 1936, Serial No. 69,671

11 Claims. (Cl. 175—294)

My invention relates to protective systems for electric circuits, more particularly to undervoltage protective systems for providing time delay protection in the event of a dip in voltage, and has for an object the provision of a simple, reliable and inexpensive system of this character.

Heretofore, undervoltage protective devices have been provided in protective systems for deenergizing translating devices in the load circuit in the event that the line voltage decreases a predetermined amount or suddenly drops to zero. It has been recognized that such protective devices should not deenergize the translating devices, for example driving motors and the like, upon a momentary dip in the line voltage since the translating devices are not injured by the return of normal voltage conditions following such a momentary reduction in voltage. Accordingly, such protective systems have been provided with time delay undervoltage protective devices for controlling the energization of suitable electromagnetically operated load controlling contacts or switch means.

In certain cases, as for example when very heavy currents are involved, it is desirable to operate the switch means or the load controlling contactors by means of fluid operators and it is a further object of my invention to provide a protective system in which a fluid operator controls the switch means to open the circuit with a time delay in response to undervoltage conditions and in which the fluid operator is arranged for substantially instantaneous operation to open the switch means at will without a time delay.

In carrying out my invention in one form, I provide a fluid operator for moving the load controlling switch means between open and closed circuit positions and means for energizing the fluid operator for operation in a direction to close the switch means, the fluid operator being maintained energized to hold the switch means in the closed circuit position. The fluid operator is arranged, upon deenergization thereof in response to a predetermined decrease in the line voltage, to maintain the switch means closed for a predetermined time after such deenergization. In order to provide for substantially instantaneous operation of the switch means to open circuit position, means may be provided for reversely energizing or plugging the fluid operator to overcome the moment of inertia thereof, whereupon the fluid operator moves the switch means to the open circuit position substantially instantaneously.

For a more complete understanding of my invention, reference should now be had to the drawing in which Fig. 1 is a somewhat diagrammatic representation of a time delay undervoltage protective system embodying my invention, and Figs. 2 and 3 are similar representations of a modified form of protective systems embodying my invention.

Referring to Fig. 1 of the drawing, I have shown my invention in one form as applied to an electric supply circuit represented by the conductors 10 10 and 11 arranged to supply a load or translating device 13 whenever a suitable load controlling contactor or switch means 14 is operated to its closed circuit position. In order to operate the switch means 14 between open and closed circuit positions, I provide a fluid operator 15 which is shown somewhat diagrammatically as comprising a fluid filled tightly sealed cylinder 16 within which is arranged a hollow movable piston 17, the piston 17 being carried by a yoke 18 which is connected to the operating element of the switch means 14.

As shown, the yoke 18 slidably extends through the cover of the sealed cylinder 16 and an electric motor 19, supported by the yoke 18 externally of the cylinder, is provided with a shaft 20 which also extends slidably through the cover of the cylinder 16 and carries at its lower end a suitable screw type impeller 21 arranged within the hollow piston 17. It will be understood, of course, that the arrangement is such that the impeller 21, when rotated, is effective to transfer fluid from one side to the other of the piston 17 and thereby move the piston in one direction or another, depending upon the direction of operation of the impeller 21. Although any suitable type of electric motor may be provided, I have shown for purposes of illustration a three-phase motor having suitable conducting leads 22, 23, and 24.

In order to connect the conducting leads 22, 23 and 24 of the motor to the source of three-phase alternating current represented by the conductors 25, 26, and 27, I provide control means which includes a pair of electromagnetic switches 28 and 29. As shown, these electromagnetic switches are connected in multiple circuit relative to the motor leads 22, 23 and 24 and the electromagnetic switch 28 is arranged when closed to connect the motor leads 22, 23 and 24 to the conductors 26, 25, and 27 respectively. Likewise, it will be seen that when the electromagnetic switch 29 is in its closed circuit position, the motor leads 22, 23, and 24 are respectively connected to the conductors 26, 27, and 25, thus reversing the connections of one phase of the motor 19 so as to energize the motor for operation in a reverse direction. It will, of course, be appreciated that this arrangement of the contacts 28 and 29 is a conventional reversing or plugging arrangement by means of which the electric motor 19 may quickly be brought to a stop and driven in a reverse direction.

As shown, the operating windings for the electromagnetic switches 28 and 29 are arranged to be energized in accordance with the voltage of the supply circuit represented by the conductors 10 and 11 through a suitable control switch comprising a movable contact 30 and a pair of fixed contacts 31 and 32 respectively, a suitable interlock 33 controlled by the load controlling switch means 14 being interposed in the energizing circuit of the operating winding for the electromagnetic switch 29.

In the drawing, the various devices are shown in their respective normal, deenergized positions and in describing the operation of my improved protective system it will first be assumed that the movable contact 30 of the control switch is operated to engage the stationary contact 31 and thereby complete an energizing circuit for the electromagnetic switch 28, which energizing circuit may be traced from the conductor 10 through the conductor 34, the contacts 30 and 31, the conductor 35, the operating winding of the electromagnetic switch 28, and by way of the conductors 36 and 37 to the other supply conductor 11. Subsequent to the establishment of this energizing circuit, the electromagnetic switch 28 is operated to its closed circuit position to connect the electric motor to the three-phase source of energy represented by the conductors 25, 26, and 27 in the manner described above. Accordingly, the motor 19 is energized to drive the impeller 21 in a direction to transfer fluid from the upper side of the piston 17 to the lower side thereof and thereby operate the load controlling switch means 14 to its closed circuit position. When the switch means 14 reaches its closed circuit position, the movable piston 17 will of course come to rest in its uppermost position and since the motor 19 is maintained energized, the impeller 21 will maintain a predetermined contact pressure at the contacts of the switch means 14.

It will now be assumed that a sudden decrease occurs in the voltage supplied to the load 13, the decrease in voltage being of sufficient magnitude to cause the electromagnetic switch 28 to drop out and thereby interrupt the energizing circuit for the electric motor 19. The electric motor 19, however, even though deenergized, will continue to spin for a short interval determined by the moment of inertia of the motor and the impeller 21 and accordingly the switch means 14 will be maintained in its closed circuit position for a predetermined time, for example one or two seconds after the occurrence of a dip in voltage. Therefore, it will be seen that if normal voltage conditions are re-established across the conductors 10 and 11 within this predetermined time, the electromagnetic switch 28 will again pick up to re-connect the motor 19 to its source of energy and the load controlling switch means 14 will accordingly not be opened. If, however, the undervoltage condition persists for a time interval longer than this predetermined time, the motor 19 and the impeller 21 will come to rest and accordingly the piston 17 will be moved by gravity in a direction to open the circuit controlling switch means 14. Thus, it will be seen that the switch means 14 is operated to its open circuit position with a time delay only in response to voltage dips of predetermined duration.

Substantially instantaneous operation of the load controlling switch means 14 to its open circuit position may be accomplished, however, simply by operating the movable contact 30 into engagement with the fixed contact 32, whereupon the energizing circuit for the electro-magnetic switch 28 is interrupted and an energizing circuit for the electromagnetic switch 29 is completed which extends from the supply conductor 10 through the conductor 34, the contacts 30 and 32, the conductor 38, the interlock contacts 33, the conductor 39, the operating winding of the electromagnetic switch 29, and by way of the conductor 37 to the other supply conductor 11. As described above, the consequent opening of the electromagnetic switch 28 and the closing of the electromagnetic switch 29 is effective immediately to reverse one phase of the motor 19 and the motor is thus plugged to a quick stop, and energized for rotation in a reverse direction so as to operate the load controlling switch means 14 quickly to its open circuit position. It will be apparent that as the switch means 14 moves to its open circuit position, the energizing circuit for the electromagnetic switch 29 is interrupted at the interlock contacts 33 and accordingly the electric motor 19 is deenergized, the piston 17 thereafter moving to its lowermost position under the force of gravity.

In Fig. 2, I have shown a modified form of protective system embodying my invention adapted for push-button operation. In this form of my invention, a suitable supply circuit represented by the conductors 41 and 42 is controlled by means of a load controlling contactor 43 arranged to be operated by a suitable fluid operator 44. The arrangement of the load controlling contactor 43 and the fluid operator 44 is identical with the arrangement described in connection with Fig. 1 and the energizing circuit of the electric driving motor 45 which forms a part of the fluid operator is controlled in an identical manner by a pair of electromagnetic switches 46 and 47. In order to control the energization of these electromagnetic switches 46 and 47, however, I provide in this embodiment of my invention a normally open start push-button 48 and a stop push-button provided with a pair of normally closed contacts 49 and a pair of normally open contacts 50. Suitable interlocks 51 and 51a carried by the load controlling contactor 43 are also provided for controlling the energizing circuits of the electromagnetic switches 46 and 47.

In the operation of this embodiment of my invention, the load controlling contactor 43 may be operated to its closed circuit position simply by depressing the push-button 48. Consequent to the operation of the push-button 48 an energizing circuit is established for the electromagnetic switch 46, which circuit extends from the supply conductor 41 through a conductor 52, the normally closed contacts 49 of the stop push-button, a pair of conductors 53 and 54, the contacts of the start button 48, the conductors 55 and 56, the operating winding of the electromagnetic switch 46, and by way of the conductors 57 and 58 to the other supply conductor 42.

Upon energization of the electromagnetic switch 46, it will, of course, be understood that the load controlling contactor 43 will be operated to its closed circuit position by the fluid operator 44 in the manner described above and consequent to the closure of the load controlling contactor, a maintaining or holding circuit for the electromagnetic switch 46 will be established through the interlock 51. This circuit may be traced from the supply conductor 41 through the conductor 52, the normally closed contacts of the push button 49, the conductor 53, the conductor 59, the interlock contacts 51, the conductors 60 and 56, the operating winding of the electromagnetic switch 46, and by way of the conductors 57 and 58 to the other supply conductor 42. It will be seen that this holding circuit by-passes the push-button 48 and accordingly the electromagnetic switch 46 is maintained energized to hold closed the energizing circuit for the electric motor 45 and thus maintain the load controlling contactor 43 in its closed circuit position.

Upon the occurrence of undervoltage conditions, that is, upon a decrease of a predetermined magnitude in the voltage of the supply circuit, the electromagnetic switch 46 will drop out to deenergize the electric motor 45 and, as described above, the load controlling contactor 43 will be maintained in its closed circuit position only for a predetermined time thereafter due to the moment of inertia of the driving motor 45 and the impeller of the fluid operator 44. In the event that normal voltage conditions are reestablished during this predetermined time, the electromagnetic switch 46 will be reclosed to reestablish the energizing circuit for the motor 45 and the load controlling contactor 43 will thus be maintained in its closed circuit position.

In this embodiment of my invention, however, it will be seen that if the undervoltage condition persists for a time interval longer than the predetermined time, the load controlling contactor will be operated to its open circuit position and the interlock contacts 51 will thereupon interrupt the maintaining circuit for the electromagnetic switch 46. Thereafter, the circuit controlling contactor 43 may be reclosed only by operating the start push-button 48, as described above.

In order to operate the load circuit controlling contactor 43 to its open circuit position substantially instantaneously, it is only necessary in this embodiment of my invention to depress the stop push-button 49 so as to open the contacts 49 and close the contacts 50, whereupon the energizing circuit for the electromagnetic switch 46 is interrupted and an energizing circuit for the electromagnetic switch 47 is established, this latter energizing circuit extending from the supply conductor 41 through the conductor 52, the conductor 61, the contacts 50, the conductor 62, the interlock contacts 51a, the conductor 63, the operating winding of the electromagnetic switch 47, and by way of the conductors 64 and 58 to the other supply conductor 42. The consequent opening of the electromagnetic switch 46 and the closing of the electromagnetic switch 48 is effective, as described in connection with Fig. 1, to reverse the energization of the electric motor 45 and thereby cause substantially instantaneous operation of the load circuit controlling contactor 43 to its open circuit position, the interlock 51a opening the energizing circuit of the electromagnetic switch 47 to deenergize the motor 45 in the manner described in connection with Fig. 1.

In the embodiment of my invention shown in Fig. 3, a suitable load controlling contactor 65 for controlling a three-phase supply circuit represented by the conductors 66, 67, and 68 is arranged for operation by a suitable fluid operator 69. In this embodiment of my invention the driving motor 70 for the fluid operator 69 is arranged to be energized directly from the three-phase load circuit through a suitable manually operable control switch 71, the load controlling contactor 65 being provided with a plurality of interlock contacts 72, 73, and 74 arranged to establish holding circuits for the motor 70 so as to maintain the fluid operator 69 energized after initial movement of the load controlling contactor 65 to its closed circuit position.

Although any suitable type of manually operable control switch may be provided, I have shown somewhat diagrammatically a three-pole, double-throw reversing switch provided with automatic means for operating the switch from a starting to a running position when the operator removes his hand from the switch handle. As shown, this manually operable switch 71 is provided with three movable contacts 75, 76, and 77 connected together by a cross-bar 78 provided with a suitable handle 79. Arranged for engagement by the movable contacts 75, 76 and 77, I provide a plurality of starting contacts 80, 81 and 82, a plurality of running contacts 83, 84 and 85, and a plurality of reversing contacts 86, 87, and 88. In order initially to energize the driving motor 70, the movable contacts of the control switch 71 are operated to an extreme left-hand position so as to engage the starting contacts 80, 81 and 82, and as soon as the operator removes his hand from the handle 79, the movable contacts 75, 76, and 77 will be operated by a plurality of suitably arranged compression springs 89, 90, and 91 to the position indicated by the broken lines.

Upon operation of the control switch 71 to its extreme left-hand position, as viewed in the drawing, energizing circuits will be established for the driving motor 70 of the fluid operator so as initially to operate the load circuit controlling contactor 65 to its closed circuit position. The energizing circuit from the supply conductor 66 may be traced through the conductor 92, the movable contact 77, the starting contact 82, and by way of the conductors 93 and 94 to the right-hand terminal of the motor 70; the energizing circuit from the supply conductor 67 may be traced through the conductor 95, the movable contact 76, the starting contact 81, and by way of the conductors 96 and 97 to the middle terminal of the motor 70; and the energizing circuit from the supply conductor 68 may be traced through the conductor 98, the movable contact 75, the starting contact 80, and by way of the conductors 99 and 100 to the left-hand terminal of the motor 70.

As soon as the load controlling contactor 65 reaches its closed circuit position, the handle of the control switch 71 may be released for automatic operation to the broken line position shown and the driving motor 70 will be maintained energized through suitable holding circuits which include the running contacts 83, 84 and 85 and the interlock contacts 72, 73 and 74. These holding circuits may respectively be traced from the movable contact 75 through the running contact 83, the conductor 101, the interlock contact 74, and by way of the conductors 102 and 100 to the left-hand terminal of the motor 70; from the movable contact 76 through the running contact 84, the conductor 103, the interlock contact 73, and by way of the conductors 104 and 97 to the middle terminal of the motor 70; and from the movable contact 77 through the running contact 85, the conductor 105, the interlock contact 72, and by way of the conductors 106 and 94 to the left-hand terminal of the motor 70. Thus, it will be seen that the motor 70 is maintained energized in accordance with the voltage of the supply circuit and accordingly, upon a failure in voltage of the supply circuit, the fluid operator 69 will be deenergized. The load controlling contactor 65 will be maintained in its closed circuit position for a predetermined time after such a voltage failure by the moment of inertia of the fluid operator as described above.

If the voltage failure continues for a predetermined time, the fluid operator will be moved by gravity to open the load circuit controlling contactor 65 and accordingly the holding circuits for the motor 70 will be interrupted at the interlock contacts 72, 73, and 74. Thereafter, the load circuit controlling contactor 65 may be reclosed only by operating the manual switch 71 to its starting or extreme left-hand position, as described above.

If it is desired to open the load circuit controlling contactor 65 quickly without a time delay, the control switch 71 may be operated to its extreme right-hand position in which the movable contacts 75, 76, and 77 respectively engage the reversing contacts 86, 87, and 88. It will be observed that the reversing contact 87 is connected by a conductor 107 to the conductor 105, this being the conductor to which the running contact 85 is connected, and the reversing contact 88 is connected by a conductor 108 to the conductor 103, to which the running contact 84 is also connected. Thus it will be seen that operation of the switch 71 to its reversing or extreme left-hand position is effective to reverse the connections of the motor 70 so as to plug the motor quickly to a stop and to energize the motor for operation in a reverse direction.

Upon movement of the control switch 71 to this reversing position, therefore, the motor 70 of the fluid operator 69 is energized for operation in a reverse direction and the load controlling contactor 65 will be quickly opened, the interlock contacts 72, 73, and 74 being effective to interrupt the energizing circuits for the motor 70 upon movement of the circuit controlling contactor 65 to its open circuit position.

While I have shown for purposes of illustration fluid operators of the type adapted to be driven in either direction, depending upon the direction of rotation of the impeller, it will be obvious, of course, that my invention is equally applicable to spring return or biased fluid operators adapted to be driven in the circuit closing direction regardless of the direction of rotation of the impeller. With such a fluid operator, a similar time delay may be obtained upon the occurrence of undervoltage conditions due to the moment of inertia of the driving motor and a substantially instantaneous operation to the open circuit position may be accomplished by plugging the motor, as described above, to bring the motor quickly to rest.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:

1. A time-delay under-voltage protective system for an electric circuit comprising circuit controlling switch means for said circuit, a fluid operator for moving said switch means between open and closed circuit positions, means for connecting said operator initially to a source of energy to move said switch means to said closed circuit position and for maintaining said operator in operation in said closed circuit position, said energy connecting means being so arranged that said fluid operator is disconnected from said source of energy upon a failure of the voltage of said circuit and said fluid operator being arranged to maintain said switch means in said closed circuit position for a predetermined time after said disconnection, whereby said switch means is operated to said open circuit position with a time delay in response to a failure of voltage.

2. A time-delay under-voltage protective system for an electric circuit comprising circuit controlling switch means for said circuit, a fluid operator for moving said switch means between open and closed circuit positions, electrical means for connecting said operator initially to a source of energy to move said switch means to said closed circuit position, means responsive to the voltage of said circuit for maintaining said operator in operation and to disconnect said operator from said source of energy upon the occurrence of predetermined undervoltage conditions, said operator being arranged to maintain said switch means closed for a predetermined time after the occurrence of predetermined under-voltage conditions and thereafter to operate said switch means to said open circuit position if said undervoltage condition continues beyond said predetermined time.

3. A time-delay under-voltage protective system for an electric circuit comprising circuit controlling switch means for said circuit, a fluid operator for moving said switch means between open and closed circuit positions, electrical means for connecting said operator initially to a source of energy to move said switch means to said closed circuit position and for maintaining said operator in operation in said closed circuit position, said connecting means being so arranged that said fluid operator is disconnected from said source of energy upon a failure of the voltage of said circuit and said fluid operator being arranged to maintain said switch means in said closed circuit position for a predetermined time after said disconnection, whereby said switch means is operated to said open circuit position with a time delay in response to a failure of voltage, and means for connecting said operator to a source of energy for reverse operation quickly to move said switch means to said open circuit position without a time delay.

4. A time-delay under-voltage protective system for an electric circuit comprising circuit controlling switch means for said circuit, a fluid operator for moving said switch means between open and closed circuit positions, and control means for connecting said operator to a source of energy for movement to said closed circuit position, said control means including means responsive to a predetermined decrease in the voltage of said circuit for disconnecting said operator from said source of energy, said fluid operator being arranged to maintain said switch means closed for a predetermined time after said disconnection and thereafter to move said switch means to said open circuit position if said predetermined decrease in voltage persists beyond said predetermined time.

5. A time-delay under-voltage protective system for an electric circuit comprising circuit controlling switch means for said circuit, a fluid operator for moving said switch means between open and closed circuit positions, control means for connecting said operator to a source of energy for movement to said closed circuit position, said control means including means responsive to a predetermined decrease in the voltage of said circuit for disconnecting said operator from said source of energy, said fluid operator being arranged to maintain said switch means in said closed circuit position for a predetermined time after said disconnection and thereafter to move said switch means to said open circuit position, and means for connecting said operator to said source of energy for reverse operation to move said switch means quickly to said open circuit position without a time delay.

6. A time-delay under-voltage protective system comprising circuit controlling switch means, a fluid operator for said switch means including rotatable impelling means for driving said operator in one direction or another, control means for connecting said impelling means to a source of energy for rotation in one direction to operate said fluid operator and said switch means to a closed circuit position, said control means including means responsive to a predetermined decrease in the voltage of the circuit controlled by said switch means for disconnecting said impelling means from said source of energy, said impelling means having a rotative moment of inertia such that said operator is maintained in said closed circuit position for a predetermined time after disconnection of said impelling means, whereby said switch means is operated to an open circuit position in response to a dip in voltage only after a predetermined time delay, and means for connecting said operator to said source of energy for reverse operation to move said operator and said switch means quickly to said open circuit position without a time delay.

7. A time-delay under-voltage protective system comprising circuit controlling switch means, a fluid operator for said switch means including rotatable impelling means for driving said operator in one direction or another, control means for connecting said impelling means to a source of energy for rotation in one direction to operate said fluid operator and said switch means to a closed circuit position, said control means including means responsive to a predetermined decrease in the voltage of the circuit controlled by said switch means for disconnecting said impelling means from said source of energy, and said impelling means having a rotative moment of inertia such that said operator is maintained in said closed circuit position for a predetermined time after disconnection of said impelling means, whereby said switch means is operated to an open circuit position in response to a dip in voltage only after a predetermined time delay.

8. A time-delay under-voltage protective system comprising circuit controlling switch means, a fluid operator for said switch means including a rotatable impeller and an electric motor for driving said impeller, electromagnetic means for energizing said motor for operation in one direction to close said switch means, said electro-magnetic means being automatically operable to de-energize said motor upon the occurrence of a predetermined decrease in the voltage of the circuit controlled by said switch means, the rotative moment of inertia of said motor and said impeller being sufficient to retain said operator and said switch means in closed circuit position for a predetermined time after said motor is deenergized, and plugging means for reversing the energizing connection of said motor whereby said operator quickly moves said switch means to open circuit position without a time delay.

9. A time-delay under-voltage protective system for an electric circuit comprising circuit controlling switch means, a fluid operator for moving said switch means between open and closed circuit position to control said circuit, electromagnetic means for controlling the connection of said fluid operator to a source of energy, manual control means for initially energizing said electromagnetic means to effect operation of said fluid operator in a direction to close said switch means, means responsive to closure of said switch means for establishing a holding circuit for said electromagnetic means, whereby said fluid operator is maintained in operation to hold said switch means in said closed circuit position, said electromagnetic means being automatically operable to disconnect said fluid operator from said source in response to a predetermined decrease in the voltage of said circuit, said fluid operator being arranged to maintain said switch means in said closed circuit position for a predetermined time after said disconnection whereby said switch means is operated to said open circuit position with a time delay upon a failure of voltage in said circuit, and manual control means for simultaneously interrupting said holding circuit and connecting said electromagnetic means to a source of energy to effect reverse operation of said fluid operator whereby said switch means is quickly operated to said open circuit position without a time delay.

10. A time-delay under-voltage protective system for an electric circuit comprising circuit controlling switch means, a fluid operator for moving said switch means between open and closed circuit positions to control said circuit, electromagnetic means for controlling the connection of said fluid operator to a source of energy, manual control means for initially energizing said electromagnetic means to effect operation of said fluid operator in a direction to close said switch means, means responsive to closure of said switch means for establishing a holding circuit for said electromagnetic means whereby said fluid operator is maintained in operation to hold said switch means in said closed circuit position, said electromagnetic means being automatically operable to disconnect said fluid operator from said source of energy in response to a predetermined decrease in the voltage of said circuit, said fluid operator being arranged to maintain said switch means in said closed circuit position for a predetermined time after said disconnection, said holding circuit being thereby maintained closed to provide for connection of said fluid operator to said source of energy by said electromagnetic means if said voltage is restored within said predetermined time, whereby said switch means is automatically operated to said open circuit position only in response to a voltage failure which persists beyond said predetermined time, and manual control means for simultaneously interrupting said holding circuit and energizing said electromagnetic means to effect connection of said source of energy for reverse operation of said fluid operator whereby said switch means is quickly operated to said open circuit position without a time delay.

11. A time-delay under-voltage protective system comprising circuit controlling switch means, a fluid operator for opening and closing said switch means, said fluid operator including an electric driving motor, electromagnetic control means energizable in accordance with the voltage of the circuit controlled by said switch means for energizing said motor for rotation in a direction to close said switch means, said electromagnetic means being arranged to deenergize said motor upon a predetermined decrease in the voltage of said circuit, the rotative moment of inertia of said motor being sufficient to maintain said operator and said switch means in said closed circuit position for a predetermined time after said motor is deenergized, said electromagnetic means serving to re-energize said motor upon the return of normal voltage conditions whereby said switch means is opened only when said predetermined decrease in voltage persists for a time interval longer than said predetermined time, and means operable at will and including said electromagnetic means for reversing the energization of said motor to operate said switch means quickly to open circuit position without a time delay.

BENJAMIN W. JONES.